Dec. 8, 1925.
J. A. TURNER
1,564,987
LENS SHADE FOR CAMERAS
Filed Sept. 27, 1923
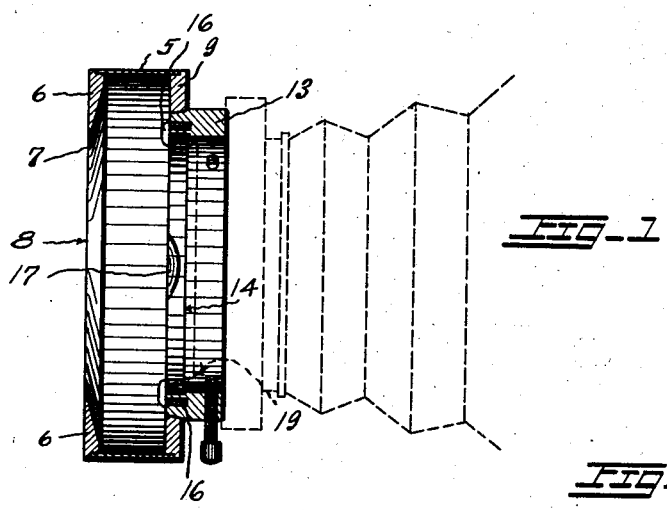
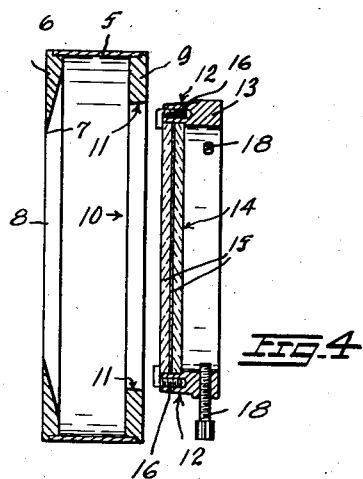
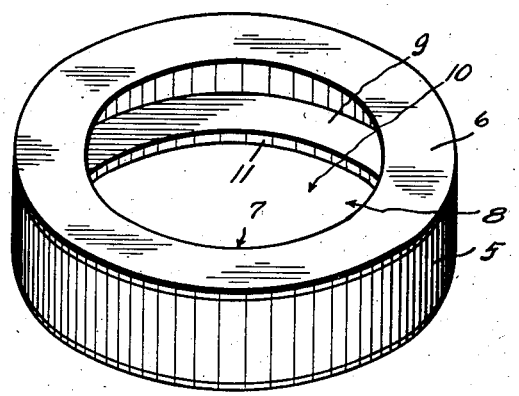
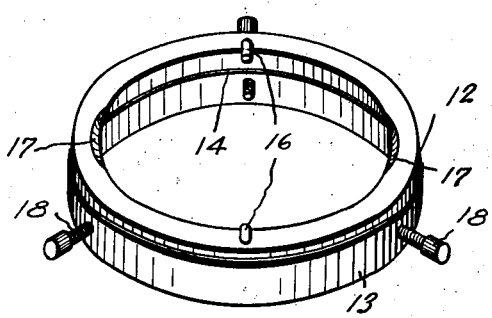
Inventor
James A. Turner
By Fred C. Matheny
Attorney Patented Dec. 8, 1925.

1,564,987

UNITED STATES PATENT OFFICE.

JAMES A. TURNER, OF SEATTLE, WASHINGTON.

LENS SHADE FOR CAMERAS.

Application filed September 27, 1923. Serial No. 665,116.

*To all whom it may concern:*

Be it known that I, JAMES A. TURNER, a citizen of the United States, and a resident of Seattle, in the county of King and State of Washington, have invented certain new and useful Improvements in Lens Shades for Cameras, of which the following is a specification.

My invention relates to improvements in lens shades for cameras, and the object of my invention is to provide a camera lens shade that will prevent the entrance into the camera lens of divergent and angularly incident rays of light that tend to blur or diffuse an image but that will not cut off any of the direct rays of light that are required to produce the image of the objects being photographed.

Other objects are to provide a camera lens shade that is simple and compact in construction, not expensive to manufacture, adjustable to lenses of different size, easy to put on and take off and that will serve as a holder for a ray filter.

A more specific object is to provide a camera lens shade embodying a tubular member arranged to be attached to a camera lens said tubular member having a portion of comparatively large diameter in front of the lens and having, at its front end, a centrally arranged light inlet opening of smaller diameter than said enlarged portion.

A further object is to provide a lens shade constructed so that there will be no possibility of light being reflected into the camera from parts of the lens shade, and to provide a lens shade made in two relatively detachable parts one of which is arranged to be detachably secured to camera lenses of different size.

Other and more specific objects will be apparent from the following description taken in connection with the accompanying drawings.

In the drawings Figure 1 is a sectional view taken on a diametral line through a camera lens shade that is constructed in accordance with my invention.

Fig. 2 is a detached view in perspective of the lens shade proper.

Fig. 3 is a detached view in perspective of the ring that holds the lens shade and that is arranged to be secured to the camera lens.

Fig. 4 is a sectional view similar to Fig. 1 except that the certain detachable parts are shown separated a short distance from each other and a ray filter is shown in connection with the device.

Referring to the drawings, throughout which like reference numerals designate like parts, I have shown a lens shade embodying a cylindrical drum 5 having, at its forward end, an inwardly directed annular flange 6 that terminates in a comparatively sharp edge 7 and that has a centrally arranged light inlet opening 8. The rear edge of the drum 5 as an inwardly extending annular flange 9 having a central opening 10 and provided with an inclined circumferential wall 11 that is adapted to fit telescopically over a similarly inclined surface 12 on the exterior of a ring member 13.

The angle of inclination of the surfaces 11 and 12 is preferably small, being in practice about five degrees, and both inclined surfaces are accurately finished and sized so that when they are telescoped as shown in Fig. 1 a frictional connection will be formed that will hold the two parts together until they are forcibly disengaged.

A shoulder 14 is provided on the interior of the ring 13 so that a ray filter 15 may be inserted into the forward end of said ring and rest against said shoulder. Catch members 16 are provided at the front of the ring 13 for holding the ray filter 15, said catch members preferably being screws that are threaded into the ring 13 and have parts of their heads removed, the remaining parts of the heads serving as means by which the screws may be turned and as means for engaging the edges of the ray filter and holding the same. When the catch members are turned to engage the ray filter they screw down onto the edge of the ray filter and clamp and hold the same securely. The edges of the ring 13 are recessed as at 17 to facilitate removal of the ray filter.

The ring 13 is provided, preferably at three equidistantly spaced points, with radially disposed screws 18 which may be tightened against the exterior of a camera lens housing 19 to secure the ring 13 to a camera, the camera lens and a fragment of a camera being shown by broken lines in Fig. 1.

If desired the parts 5, 6 and 9, of the shade proper, may all be made of one integral piece.

In operation after the ring 13 is secured on a camera lens the lens shade may be instantly attached to or detached from said ring and the ray filter may be very quickly fitted into or removed from said ring. The ray filter may be used either with or without the lens shade portion.

When the device is applied as shown in Fig. 1, rays of light tending to enter the lens at a sharp angle from any side will be intercepted by the shade while those angular rays of light that enter the shade from in front and are incident on the interior of the drum 5 can not be reflected into the lens. The edge 7 surrounding the opening 8 in the front wall 6, being relatively thin and sharp, will not afford sufficient surface to reflect any appreciable amount of light into the camera lens.

The interior of the drum 5 and all other interior parts will preferably be painted black as a further safeguard against the reflection of light.

Making the drum 5 of larger diameter than the openings in the front wall 6 and rear wall 9 and of larger diameter than the camera lens is an important feature in preventing light from being reflected into the camera lens, it being readily apparent that a tubular reflector of substantially the same size as the camera lens would afford an internal surface from which light would be reflected at an angle into the lens.

The shade member is relatively flat and compact in construction and may be quickly and easily removed and applied. When a camera on which the device is being used is to be folded the shade portion may be removed and the ring 13 may be left attached to the lens.

The foregoing description and accompanying drawings clearly disclose what I now regard as a preferred form of my invention, but, it will be understood that this disclosure is merely illustrative and that such changes in the device may be made as are within the scope and spirit of the following claims.

I claim:

1. The combination with a camera lens, of a lens shade embodying a drum of larger diameter than the camera lens and relatively short as compared to its diameter and having an inwardly directed flange at each end, each flange having a centrally arranged circular opening, the width of the front flange being substantially equal to the length of said drum and the distance between said flanges being less than the length of said drum to prevent reflection of light from the interior of said drum into the camera lens.

2. The combination with a camera having a lens, of a lens shade embodying a drum of larger diameter than said lens and of a length equal to substantially one fourth of its diameter, means for securing said drum to the front end of said camera lens, an inwardly directed annular flange at the front edge of said lens shade terminating in a knife edge, an inwardly directed annular flange at the rear end of said lens shade, the width of said flanges being substantially equal to the distance between said flanges, whereby reflection of light from the inside of said drum into said camera lens will be prevented.

3. A lens shade of the class described embodying a relatively short drum, an inwardly directed flange at the front end of said drum, said front flange having a centrally arranged opening of less diameter than said drum the edge of said front flange surrounding said opening being very thin, an inwardly directed flange at the rear edge of said drum, said rear flange having a centrally arranged opening of less diameter than said drum, the edge of said rear flange surrounding said opening being beveled slightly and a ring arranged to be secured to a camera lens said ring having an external beveled surface over which the slightly beveled internal surface of said rear flange may fit telescopically to secure said lens shade to said ring.

4. In a lens shade, a ring arranged to be secured to the front end of a camera and having at its forward end a portion of enlarged internal diameter forming a shoulder, a ray filter arranged to fit within said ring portion of enlarged diameter, rotatable catch members on the front end of said ring for holding said ray filter and a lens shade arranged to be secured to said ring in front of said ray filter.

The foregoing specification signed at Seattle, Wash., this 19th day of September, 1923.

JAMES A. TURNER.